(12) United States Patent
Kim et al.

(10) Patent No.: US 10,582,156 B2
(45) Date of Patent: Mar. 3, 2020

(54) ELECTRONIC DEVICE FOR PERFORMING VIDEO CALL AND COMPUTER-READABLE RECORDING MEDIUM

(71) Applicant: Samsung Electronics Co., Ltd., Suwon-si, Gyeonggi-do (KR)

(72) Inventors: Soo-Yeon Kim, Seoul (KR); Won-Nam Jang, Suwon-si (KR); Kwang-Youn Kim, Seoul (KR); Su-Yeon Hwang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/472,649

(22) PCT Filed: Jan. 8, 2018

(86) PCT No.: PCT/KR2018/000346
§ 371 (c)(1),
(2) Date: Jun. 21, 2019

(87) PCT Pub. No.: WO2018/131852
PCT Pub. Date: Jul. 19, 2018

(65) Prior Publication Data
US 2019/0364245 A1 Nov. 28, 2019

(30) Foreign Application Priority Data
Jan. 10, 2017 (KR) .......................... 10-2017-0003796

(51) Int. Cl.
*H04N 7/14* (2006.01)
*H04N 5/272* (2006.01)
(Continued)

(52) U.S. Cl.
CPC ............. *H04N 7/147* (2013.01); *H04N 5/265* (2013.01); *H04N 5/272* (2013.01); *H04W 4/029* (2018.02)

(58) Field of Classification Search
CPC ....................................... H04N 7/14
See application file for complete search history.

(56) References Cited

U.S. PATENT DOCUMENTS 8,301,174 B2 * 10/2012 An .................... H04M 1/72572
455/39
8,878,893 B2 * 11/2014 Andresen ................. H04N 7/15
348/14.03
(Continued)

FOREIGN PATENT DOCUMENTS

JP 1997-244845 A 9/1997
JP 2006-262484 A 9/2006
(Continued)

*Primary Examiner* — Olisa Anwah
(74) *Attorney, Agent, or Firm* — Jefferson IP Law, LLP

(57) ABSTRACT

Disclosed is a first electronic device for performing a video call. The first electronic device may comprise: a communication module for receiving video and audio for a video call from a second electronic device connected thereto for the video call; a display; a camera module; and a processor. The processor may: receive location information indicating the location of the second electronic device from the second electronic device through the communication module; identify a place where the second electronic device is located, using at least one of the received video and the received location information; generate a first spatial image indicating the second electronic device being located in the identified place; and transmit an image captured by the camera module and the generated first spatial image to the second electronic device through the communication module.

15 Claims, 11 Drawing Sheets

(51) Int. Cl.
*H04N 5/265* (2006.01)
*H04W 4/029* (2018.01)

(56) References Cited

U.S. PATENT DOCUMENTS

| | | |
|---|---|---|
| 2004/0095385 A1 | 5/2004 | Koo et al. |
| 2006/0210045 A1 | 9/2006 | Valliath et al. |
| 2006/0221188 A1 | 10/2006 | Moon |
| 2007/0070186 A1* | 3/2007 | Fujimori ............... H04N 7/147 348/14.03 |
| 2007/0268361 A1* | 11/2007 | Ren .................. H04L 29/06027 348/14.02 |
| 2011/0292076 A1 | 12/2011 | Wither et al. |
| 2012/0206558 A1* | 8/2012 | Setton ................... H04N 7/147 348/14.03 |
| 2012/0236105 A1* | 9/2012 | Alberth ................ G06T 19/006 348/14.07 |
| 2012/0327172 A1 | 12/2012 | El-Saban et al. |
| 2014/0267583 A1* | 9/2014 | Zhu ....................... H04N 19/21 348/14.13 |
| 2015/0124043 A1* | 5/2015 | Engstrand .............. H04N 7/141 348/14.03 |
| 2016/0210998 A1* | 7/2016 | Leske .................... G06T 11/60 |

FOREIGN PATENT DOCUMENTS

| | | |
|---|---|---|
| JP | 2014-039186 A | 2/2014 |
| KR | 10-2004-0043280 A | 5/2004 |
| KR | 10-2009-0005922 A | 1/2009 |
| KR | 10-2012-0008400 A | 1/2012 |
| KR | 10-2012-0067479 A | 6/2012 |

* cited by examiner

ELECTRONIC DEVICE FOR PERFORMING VIDEO CALL AND COMPUTER-READABLE RECORDING MEDIUM

CROSS-REFERENCE TO RELATED APPLICATION(S)

This application is a U.S. National Stage application under 35 U.S.C. § 371 of an International application number PCT/KR2018/000346, filed on Jan. 8, 2018, which is based on and claimed priority of a Korean patent application number 10-2017-0003796, filed on Jan. 10, 2017, in the Korean Intellectual Property Office, the disclosure of which is incorporated by reference herein in its entirety.

BACKGROUND

1. Field

The present disclosure relates to an electronic device for performing video communication. More specifically, the present disclosure relates to an electronic device for providing more realistic video communication.

2. Description of the Related Art

Virtual reality (VR) or augmented reality (AR) technology has been recently developed to provide more realistic experiences to users.

Generally, VR refers to an almost-real environment or situation created by computer graphics, and AR, a field of VR, is a computer graphic technique which combines a real environment with a virtual object or information such that the virtual object or information which may be seen as it really exists in the environment.

VR or AR technology may be provided in combination with various services such as education, gaming, navigation, advertisement, video communication, etc., through electronic devices.

A VR image or AR image based on the VR or AR technology may be generated in a variety of ways using an image captured using a camera or depth information of a real space obtained through the camera.

SUMMARY

A recent trend is to increasingly use a video communication service, a video conference service, etc., through electronic devices. To provide more realistic experiences to users using a video communication service, a video conference service, etc., a method using a VR image or an AR image has been developed and used.

However, an environmental factor changing from moment to moment, such as a place, a time, a weather, etc., is not shared in real time among electronic devices providing a video communication service, a video conference service, etc. As a result, it may be difficult to provide the users with realistic and immersive experiences.

Various embodiments of the present disclosure provide an electronic device to solve the foregoing or other problems.

According to various embodiments of the present disclosure, a first electronic device includes a communication module, a display, a camera module, and a processor, in which the processor is configured to receive an image and voice for video communication from a second electronic device connected for the video communication through the communication module, receive location information indicating a location of the second electronic device from the second electronic device through the communication module, to identify a place where the second electronic device is located, by using at least one of the received image or the received location information, to generate a first spatial image indicating the second electronic device being located in the identified place, and to transmit an image captured through the camera module and the generated first spatial image to the second electronic device through the communication module.

According to various embodiments of the present disclosure, a non-transitory computer-readable recording medium has recorded thereon a program to be executed on a computer, in which the program may include executable instructions that cause, when executed by a processor, the processor to perform operations of receiving an image and voice for video communication from an electronic device connected for the video communication, receiving location information indicating a location of the electronic device from the electronic device, identifying a place where the electronic device is located, by using at least one of the received image or the received location information, generating a spatial image indicating the electronic device being located in the identified place, and transmitting the captured image and the generated spatial image to the electronic device.

According to various embodiments of the present disclosure, an operation method of a first electronic device includes receiving an image and voice for video communication from a second electronic device connected for the video communication, receiving location information indicating a location of the second electronic device from the second electronic device, identifying a place where the second electronic device is located, by using at least one of the received image or the received location information, generating a first spatial image indicating the second electronic device being located in the identified place, and transmitting the captured image and the generated first spatial image to the second electronic device.

An electronic device according to various embodiments of the present disclosure may identify an environmental factor of a counterpart electronic device connected for providing a video communication service, a video conference service, etc., and provide the video communication service, the video conference service, etc., through an image generated based on the identified environmental factor. Thus, users may be provided with realistic and immersive experiences.

DETAILED DESCRIPTION

Figure 1:
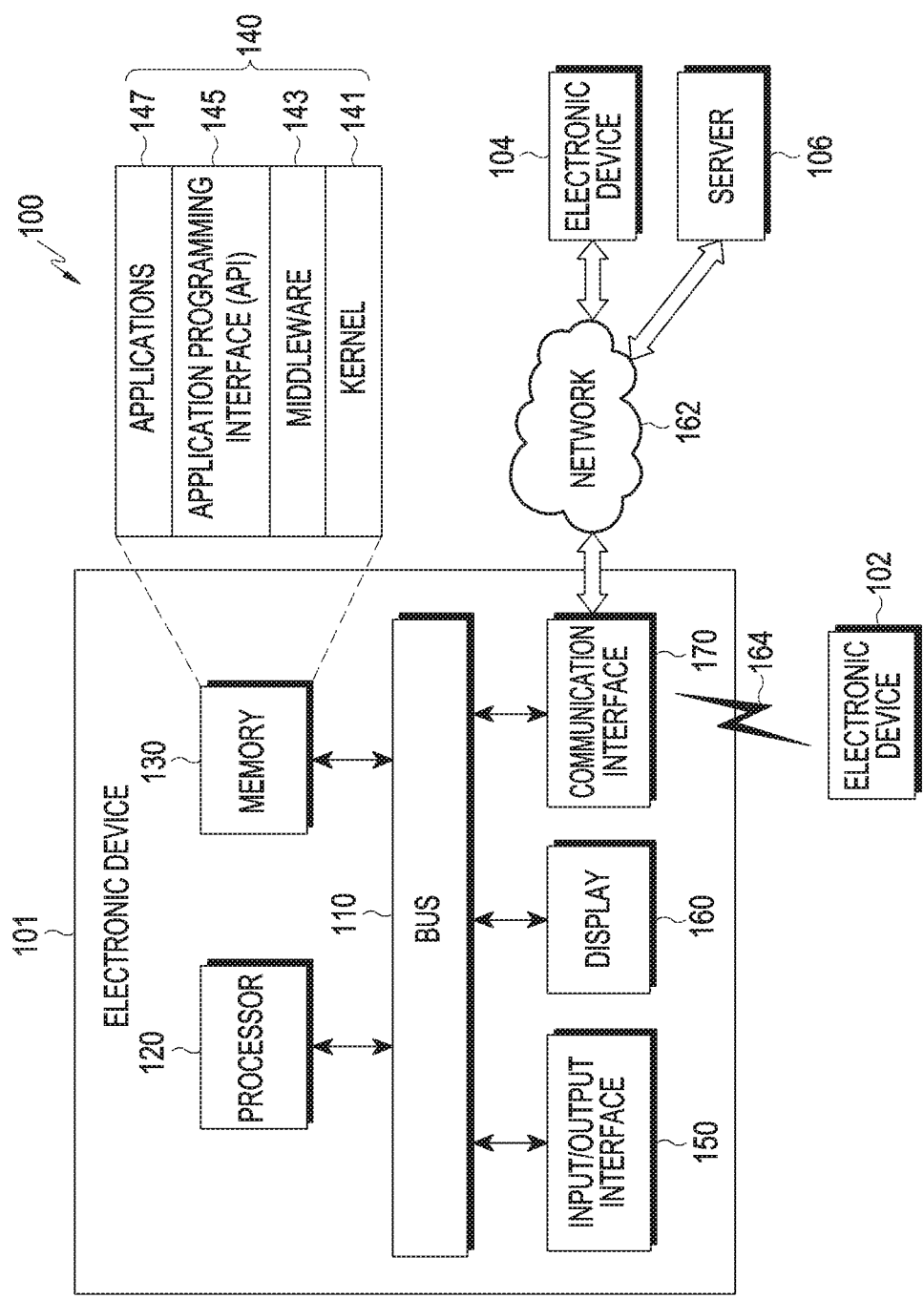
FIG. 1 illustrates a network environment including an electronic device according to various embodiments of the present disclosure.

Hereinafter, various embodiments of the present disclosure will be disclosed with reference to the accompanying drawings. However, embodiments and terms used therein are not intended to limit the present disclosure to particular embodiments, and it should be construed as including various modifications, equivalents, and/or alternatives according to the embodiments of the present disclosure. With regard to the description of the drawings, similar reference numerals may be used to refer to similar or related elements. It is to be understood that a singular form of a noun corresponding to an item may include one or more of the things, unless the relevant context clearly indicates otherwise. In the present disclosure, an expression such as "A or B," "at least one of A and/or B," or "one or more of A and/or B" may include all possible combinations of together listed items. Expressions such as "first," "second," "primarily," or "secondary," used herein may represent various elements regardless of order and/or importance and do not limit corresponding elements. When it is described that an element (such as a first element) is "operatively or communicatively coupled with/to" or "connected" to another element (such as a second element), the element can be directly connected to the other element or can be connected to the other element through another element (e.g., a third element).

An expression "configured to (or set)" used in the present disclosure may be replaced with, for example, "suitable for," "having the capacity to," "adapted to," "made to," "capable of," or "designed to" according to a situation. Alternatively, in some situation, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a central processing unit (CPU) or an application processor) that can perform a corresponding operation by executing at least one software program stored at a memory device.

An electronic device according to various embodiments of the present disclosure may include at least one of, for example, a smartphone, a tablet personal computer (PC), a mobile phone, a video phone, an electronic-book (e-book) reader, a desktop PC, a laptop PC, a netbook computer, a workstation, a server, a personal digital assistant (PDA), a portable multimedia player (PMP), an MP3 player, a mobile medical equipment, a camera, or a wearable device. Examples of the wearable device may include at least one of an accessory type (e.g., a watch, a ring, a bracelet, an anklet, a necklace, glasses, contact lenses, head-mounted device (HMD), etc.), a fabric or cloth-integrated type (e.g., electronic clothing, etc.), a body-attached type (e.g., a skin pad, a tattoo, etc.), a body implantable circuit, or the like. In some embodiments, the electronic device may include, for example, at least one of a television (TV), a digital video disk (DVD) player, audio equipment, a refrigerator, an air conditioner, a vacuum cleaner, an oven, a microwave oven, a laundry machine, an air cleaner, a set-top box, a home automation control panel, a security control panel, a media box (e.g., Samsung HomeSync™, Apple TV™, or Google TV™), a game console (e.g., Xbox™ or PlayStation™), an electronic dictionary, an electronic key, a camcorder, or an electronic frame.

In other embodiments, the electronic device may include at least one of various medical equipment (for example, various portable medical measurement devices (a blood glucose meter, a heart rate measuring device, a blood pressure measuring device, a body temperature measuring device, etc.), magnetic resonance angiography (MRA), magnetic resonance imaging (MRI), computed tomography (CT), an imaging device, or an ultrasonic device), a navigation system, a global navigation satellite system (GNSS), an event data recorder (EDR), a flight data recorder (FDR), a vehicle infotainment device, electronic equipment for ships (e.g., a navigation system and gyro compass for ships), avionics, a security device, a vehicle head unit, an industrial or home robot, a drone, an automatic teller's machine (ATM), a point of sale (POS), Internet of things (e.g., electric bulbs, various sensors, electricity or gas meters, sprinkler devices, fire alarm devices, thermostats, streetlights, toasters, exercise machines, hot-water tanks, heaters, boilers, and so forth). According to some embodiments, the electronic device may include a part of a piece of furniture, building/structure or a part of a vehicle, an electronic board, an electronic signature receiving device, a projector, and various measuring instruments (e.g., a water, electricity, gas, electric wave measuring device, etc.). According to various embodiments, the electronic device may be flexible or may be a combination of two or more of the above-described various devices. According to an embodiment of the disclosure, the electronic devices are not limited to those described above. Herein, the term "user" used in various embodiments of the present disclosure may refer to a person who uses the electronic device or a device using the electronic device (e.g., an artificial intelligence electronic device).

Referring to FIG. 1, an electronic device 101 in a network environment 100 according to various embodiments of the present disclosure is disclosed. The electronic device 101 may include a bus 110, a processor 120, a memory 130, an input/output (I/O) interface 150, a display 160, and a communication interface 170. According to some embodiments, the electronic device 101 may omit at least one of the foregoing elements or may further include other elements. The bus 110 may include a circuit for connecting, e.g., the elements 110 to 170 and delivering communication (e.g., a control message or data) between the elements 110 to 170. The processor 120 may include one or more of a central processing unit (CPU), an application processor (AP), and a communication processor (CP). The processor 120 may perform operations or data processing for control and/or communication of, for example, at least one other elements of the electronic device 101.

The memory 130 may include a volatile and/or nonvolatile memory. The memory 130 may store, for example, instructions or data associated with at least one other elements of the electronic device 101. According to an embodiment of the present disclosure, the memory 130 may store software and/or a program 140. The program 140 may include at least one of, for example, a kernel 141, middleware 143, an application programming interface (API) 145, and/or an application program (or "application") 147, and the like. At least some of the kernel 141, the middleware 143, and the API 145 may be referred to as an operating system (OS). The kernel 141 may control or manage, for example, system resources (e.g., the bus 110, the processor 120, the memory 130, etc.) used to execute operations or functions implemented in other programs (e.g., the middleware 143, the API 145, or the application program 147). The kernel 141 provides an interface through which the middleware 143, the API 145, or the application program 147 accesses separate components of the electronic device 101 to control or manage the system resources.

The middleware 143 may work as an intermediary for allowing, for example, the API 145 or the application program 147 to exchange data in communication with the kernel 141. In addition, the middleware 143 may process one or more task requests received from the application program 147 based on priorities. For example, the middleware 143 may give a priority for using a system resource (e.g., the bus 110, the processor 120, the memory 130, etc.) of the electronic device 101 to at least one of the application programs 147, and may process the one or more task requests. The API 145 is an interface used for the application 147 to control a function provided by the kernel 141 or the middleware 143, and may include, for example, at least one interface or function (e.g., an instruction) for file control, window control, image processing or character control. The I/O interface 150 may deliver, for example, an instruction or data input from a user or another external device to other component(s) of the electronic device 101, or output an instruction or data received from other component(s) of the electronic device 101 to a user or another external device.

The display 160 may include, for example, a liquid crystal display (LCD), a light emitting diode (LED) display, an organic light emitting diode (OLED) display, a microelectromechanical system (MEMS) display, or an electronic paper display. The display 160 may, for example, display various contents (e.g., a text, an image, a video, an icon, and/or a symbol, etc.) to users. The display 160 may include a touchscreen, and may receive a touch, a gesture, proximity, or a hovering input, for example, by using an electronic pen or a part of a body of a user. The communication interface 170 may establish communication between the electronic device 101 and an external device (e.g., the vehicle device 102, the electronic device 104, or the server 106). For example, the communication interface 170 may be connected to a network 162 through wireless communication or wired communication to communicate with an external device (e.g., the second external electronic device 104 or the server 106).

The wireless communication may include cellular communication using at least one of Long Term Evolution (LTE), LTE-Advanced (LTE-A), Code Division Multiple Access (CDMA), Wideband CDMA (WCDMA), a Universal Mobile Telecommunication System (UMTS), Wireless Broadband (WiBro), or Global System for Mobile Communications (GSM)). According to an embodiment, the wireless communication may include at least one of Wireless Fidelity (WiFi), Bluetooth, Bluetooth Low Energy (BLE), Zigbee, near field communication (NFC), magnetic secure transmission (MST), radio frequency (RF), and a body area network (BAN). According to an embodiment, the wireless communication may include a global navigation satellite system (GNSS). The GNSS may include, for example, at least one of a global positioning system (GPS), a global navigation satellite system (Glonass), a Beidou navigation satellite system ("Beidou"), and Galileo, the European global satellite-based navigation system. Hereinbelow, "GPS" may be used interchangeably with "GNSS". The wired communication may include, for example, at least one of a universal serial bus (USB), a high definition multimedia interface (HDMI), Recommended Standard 232 (RS-232), power line communication, a plain old telephone service (POTS), or the like. The network 162 may include a telecommunications network, for example, at least one of a computer network (e.g., a local area network (LAN) or a wide area network (WAN)), Internet, and a telephone network.

Each of the first external electronic device 102 and the second external electronic device 104 may be a device of the same type as or a different type than the electronic device 101. According to various embodiments of the present disclosure, some or all of operations performed by the electronic device 101 may be performed in another electronic device or a plurality of electronic devices (e.g., the electronic device 102 or 104, or the server 106). According to an embodiment of the present disclosure, when the electronic device 101 has to perform a function or a service automatically or at a request, the electronic device 101 may request another device (e.g., the electronic devices 102 or 104 or the server 106) to perform at least some functions associated with the function or the service instead of or in addition to executing the function or the service. The another electronic device (e.g., the electronic device 102 or 104 or the server 106) may execute the requested function or additional function and deliver the execution result to the electronic device 101. The electronic device 101 may then process or further process the received result to provide the requested function or service. To that end, a cloud computing, distributed computing, or client-server computing technology may be used, for example.

According to various embodiments of the present disclosure, the electronic device 101 may perform video communication in connection with another electronic device. For example, the electronic device 101 may transmit and receive an image and voice for video communication to and from another electronic device connected for video communication through the communication interface 170. The electronic device 101 may display an image received from another electronic device on the display 160 and output voice received from the other electronic device through a speaker. The electronic device 101 may transmit an image obtained through a camera module included therein and voice obtained through a microphone included therein to the other electronic device. The following description will be focused on an operation in which the electronic device 101 performs video communication with another electronic device, but the present disclosure may also be applied to various fields, such as video conference, etc., in which the electronic device 101 outputs an image and voice by transmitting and receiving an image and voice to and from the other electronic device.

According to various embodiments of the present disclosure, the processor 120 may receive, from another electronic device connected for video communication, location information indicating a location of the other electronic device through the communication interface 170. The other electronic device may generate the location information by using a GPS signal received through a GPS module and transmit the location information to the electronic device 101. The other electronic device may transmit the GPS signal itself to the electronic device 101. The location information may be received from the other electronic device, together with or independently of an image and voice for video communication.

The processor 120 may request the other electronic device to transmit the location information. For example, the processor 120 may request the location information in establishment for video communication with the other electronic device or the location information at preset intervals after establishment for video communication with the other electronic device. The other electronic device may transmit the location information to the electronic device 10 even without being requested by the electronic device 101.

According to various embodiments of the present disclosure, the processor 120 may identify a place where the other electronic device is located, by using at least one of the image or the location information received from the other electronic device. For example, the processor 120 may identify the place where the other electronic device is located, by analyzing the received image or by using the location information. When the processor 120 may not be capable of identifying the location of the other electronic device merely with the image or the location information, the processor 120 may identify the location of the other electronic device using both the image and the location information.

For example, the processor 120 may extract a plurality of feature points from the received image to identify the place where the other electronic device is located. The processor 120 may search for at least one place corresponding to the extracted feature points. The processor 120 may search for at least one place corresponding to the extracted feature points in information related to various places, which is stored in an external server or the memory 130. The information related to the places may include image information obtained by capturing a place in all directions at 360 degrees.

When one place is searched, the processor 120 may identify the searched place as the place where the other electronic device is located. When a plurality of places is searched, the processor 120 may identify a place corresponding to the location information among the plurality of searched places as the place where the other electronic device is located. To more accurately identify the place where the other electronic device is located, the processor 120 may further use the location information.

The processor 120 may identify, based on the location of the other electronic device identified using the location information, the place where the other electronic device is located. However, when the place where the other electronic device is located is not specified using the location information, the processor 120 may further use the image received from the other electronic device. A method of identifying the place where the other electronic device is located, by using the received image is identical to the foregoing description, and thus will not be separately described. The above-described method of identifying the place where the other electronic device is located is merely intended for description, and the processor 120 may identify the place where the other electronic device is located, by using various methods based on the location information and the image received from the other electronic device, as well as the above-described method.

According to various embodiments of the present disclosure, the processor 120 may generate a first spatial image indicating the other electronic device being located in the identified place. The first spatial image may be a two-dimensional (2D) image or a three-dimensional (3D) image (e.g., a VR image or an AR image). For example, the processor 120 may further generate the first spatial image based on information related to the identified place where the other electronic device is located, in which the information is stored in an external server or the memory 130. The processor 120 may generate the first spatial image based on an image captured for the place where the other electronic device is located, in which the image is included in the information related to the place.

According to various embodiments of the present disclosure, the processor 120 may transmit the image captured through the camera module and the generated first spatial image to the other electronic device through the communication interface 170. For example, the processor 120 may transmit the captured image and the first spatial image together to the other electronic device or a synthesized image generated by synthesizing the captured image with the first spatial image to the other electronic device.

The processor 120 may extract a partial image corresponding to the user of the electronic device 101 from the captured image. The processor 120 may generate a first synthesized image of the extracted partial image and the first spatial image, and transmit the generated first synthesized image to the other electronic device through the communication interface 170. The other electronic device may receive the first synthesized image and display the first synthesized image on the display.

When the other electronic device receives the captured image and the first spatial image, the other electronic device may extract a partial image corresponding to the user of the electronic device 101 from the captured image. The other electronic device may generate a synthesized image by synthesizing the extracted partial image with the first spatial image, and display the generated synthesized image on the display.

According to various embodiments of the present disclosure, the processor 120 may obtain at least one of weather information or time information corresponding to the location information received from the other electronic device. For example, upon receiving the location information from the other electronic device, the processor 120 may transmit a request for at least one of the weather information or the time information corresponding to the received location information to the external server. When determining to use at least one of the weather information or the time information to generate the first spatial image, the processor 120 may transmit a request for at least one of the weather information or the time information corresponding to the location information to the external server.

According to various embodiments of the present disclosure, the processor 120 may determine based on an image received from the other electronic device whether to use at least one of the weather information or the time information to generate the first spatial image. The processor 120 may determine based on the received image whether a place where the other electronic device is located is an indoor or outdoor place, and determine, based on a result of the determination, whether to use at least one of the weather information or the time information to generate the first spatial image.

For example, when determining that the place where the other electronic device is located is an indoor place, the processor 120 may determine not to use either the weather information or the time information for generation of the first spatial image. When determining that the place where the other electronic device is located is an outdoor place, the processor 120 may determine to use the weather information and the time information for generation of the first spatial image indicating the other electronic device being located in the place.

For example, to determine whether the place where the other electronic device is located is an indoor place or an outdoor place from the received image, the processor 120 may use color information and texture information of the received image. A change in artificial illumination such as fluorescent light, etc., occurs in an indoor place, whereas a change occurs in natural light in an outdoor place. There may be a unique texture of furniture, wallpaper, etc., in an indoor place, whereas there may be a unique texture of sky, a road, a building, etc., in an outdoor place. Thus, the processor 120 may extract the color information and the texture information from the received image and determine whether the place where the other electronic device is located is an indoor place or an outdoor place, by using the extracted color information and texture information. The above-described method of determining whether the place where the other electronic device is located is an indoor place or an outdoor place is merely an example for description, such that the place where the other electronic device is located may be determined as the indoor place or the outdoor place, based on various pieces of information available in the received image.

According to various embodiments of the present disclosure, the processor 120 may generate location information indicating a location of the electronic device 101 based on a GPS signal obtained through the GPS module of the electronic device 101. The processor 120 may transmit the location information to the other electronic device through the communication interface 170. The processor 120 may receive location information of the other electronic device and transmit the location information of the electronic device 101 to the other electronic device. The other electronic device may also generate the second spatial image indicating the electronic device 101 being located in the place. Thus, the processor 120 may transmit the location information of the electronic device 101 to the other electronic device.

According to various embodiments of the present disclosure, the processor 120 may receive from the other electronic device, the second spatial image generated by the other electronic device to indicate the place where the electronic device 101 is located, and an image obtained by the other electronic device, through the communication space 170. A method of generating the second spatial image by the other electronic device is the same as the above-described method of generating the first spatial image, and thus will not be described separately.

The processor 120 may generate a second synthesized image by synthesizing the second spatial image with the image obtained by the other electronic device and display the second synthesized image on the display 160. For example, the processor 120 may extract a partial image corresponding to the user of the second electronic device from the image obtained by the other electronic device and generate the second synthesized image by synthesizing the extracted partial image with the second spatial image.

When the processor 120 receives the second synthesized image generated by synthesizing the second spatial image with the image obtained by the other electronic device from the other electronic device, the processor 120 may display the received second synthesized image on the display 160 without separate processing simultaneously with the generated second synthesized image.

According to various embodiments of the present disclosure, the processor 120 may display the image captured through the camera module of the electronic device 101 and the second synthesized image on the display 160 at the same time. The processor 120 may generate a third synthesized image by synthesizing the second spatial image with a partial image corresponding to the user in the image captured through the camera module, and display the second synthesized image and the third synthesized image on the display 160 at the same time. In this way, the electronic device 101 may provide realism and immersion to the user like in the same space as the user of the other electronic device.

Figure 2:
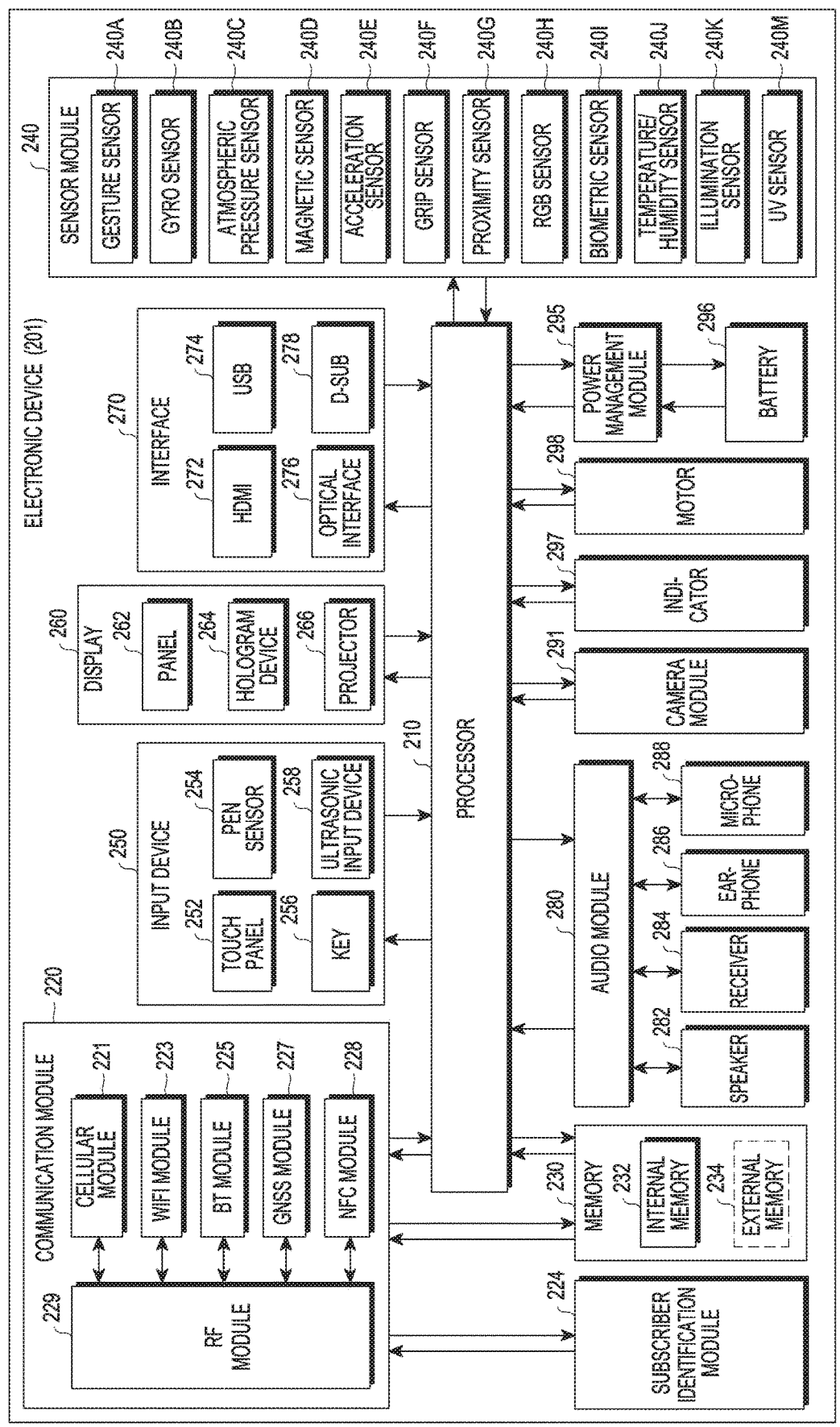
FIG. 2 is a block diagram of a programming module according to various embodiments of the present disclosure.

FIG. 2 is a block diagram of an electronic device 201 according to various embodiments of the present disclosure. The electronic device 201 may form the entire electronic device 101 illustrated in FIG. 1 or a part of the electronic device 101 illustrated in FIG. 1. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 controls multiple hardware or software components connected to the processor 210 by driving an operating system (OS) or an application program, and performs processing and operations with respect to various data. The processor 210 may be implemented with, for example, a system on chip (SoC). According to an embodiment of the present disclosure, the server 210 may include a graphic processing unit (GPU) and/or an image signal processor. The processor 210 may include at least some of the elements illustrated in FIG. 2 (e.g., the cellular module 221). The processor 210 loads an instruction or data received from at least one of other elements (e.g., a non-volatile memory) into a volatile memory to process the instruction or data, and stores result data in the non-volatile memory.

The communication module 220 may have a configuration that is the same as or similar to the communication interface 170. The communication module 220 may include, for example, the cellular module 221, a WiFi module 223, a Bluetooth (BT) module 225, a GNSS module 227, an NFC module 228, and a radio frequency (RF) module 229. The cellular module 221 may provide, for example, a voice call, a video call, a text service, or an Internet service over a communication network. According to an embodiment of the present disclosure, the cellular module 221 may identify and authenticate the electronic device 201 in a communication network by using the SIM 224 (e.g., a SIM card). According to an embodiment of the present disclosure, the cellular module 221 may perform at least one of functions that may be provided by the processor 210. According to an embodiment of the present disclosure, the cellular module 221 may include a communication processor (CP). According to an embodiment of the present disclosure, at least some (e.g., two or more) of the cellular module 221, the WiFi module 223, the BT module 225, the GNSS module 227, or the NFC module 228 may be included in one integrated chip (IC) or IC package. The RF module 229 may, for example, transmit and receive a communication signal (e.g., an RF signal). The RF module 229 may include a transceiver, a power amp module (PAM), a frequency filter, a low noise amplifier (LNA), or an antenna. According to another embodiment of the present disclosure, at least one of the cellular module 221, the WiFi module 223, the BT module 225, the GNSS module 227, or the NFC module 228 may transmit and receive an RF signal through the separate RF module. The SIM 224 may, for example, include a card including a SIM or an embedded SIM, and may include unique identification information (e.g., an integrated circuit card identifier (ICCID) or subscriber information (e.g., an international mobile subscriber identity (IMSI)).

The memory 230 (e.g., the memory 130) may, for example, include an internal memory 232 and/or an external memory 234. The internal memory 232 may, for example, include at least one of a volatile memory (e.g., dynamic random access memory (DRAM), static RAM (SRAM), synchronous dynamic RAM (SDRAM), etc.), and a non-volatile memory (e.g., one time programmable read only memory (OTPROM), programmable ROM (PROM), erasable and programmable ROM (EPROM), electrically erasable and programmable ROM (EEPROM), etc.), mask ROM, flash ROM, a flash memory, and a solid state drive (SSD). The external memory 234 may further include flash drive, for example, compact flash (CF), secure digital (SD), micro-SD, mini-SD, extreme Digital (xD), a multi-media card (MMC), or a memory stick. The external memory 234 may be functionally or physically connected with the electronic device 201 through various interfaces.

The sensor module 240 measures physical quantity or senses an operation state of the electronic device 201 to convert the measured or sensed information into an electric signal. The sensor module 240 may, for example, include at least one of a gesture sensor 240A, a gyro sensor 240B, a pressure sensor 240C, a magnetic sensor 240D, an acceleration sensor 240E, a grip sensor 240F, a proximity sensor 240G, a color sensor 240H (e.g., RGB sensor), a biometric sensor 240I, a temperature/humidity sensor 240J, an illumination sensor 240K, and a ultraviolet (UV) sensor 240M. Additionally or alternatively, the sensor module 240 may include an E-nose sensor (not shown), an electromyography (EMG) sensor (not shown), an electroencephalogram (EEG) sensor (not shown), an electrocardiogram (ECG) sensor (not shown), an infrared (IR) sensor, an iris sensor, and/or a fingerprint sensor. The sensor module 240 may further include a control circuit for controlling at least one sensor included therein. In some embodiment of the present disclosure, the electronic device 201 may further include a processor configured to control the sensor module 240 as part of or separately from the processor 210, to control the sensor module 240 during a sleep state of the processor 210.

The input device 250 may include, for example, a touch panel 252, a (digital) pen sensor 254, a key 256, or an ultrasonic input device 258. The touch panel 252 may use at least one of a capacitive type, a resistive type, an IR type, or an ultrasonic type. The touch panel 252 may further include a control circuit. The touch panel 252 may further include a tactile layer to provide tactile reaction to the user. The (digital) pen sensor 254 may include a recognition sheet which is a part of the touch panel 252 or a separate recognition sheet. The key 256 may also include a physical button, an optical key, or a keypad. The ultrasonic input device 258 senses ultrasonic waves generated by an input means through a microphone (e.g., the microphone 288) and checks data corresponding to the sensed ultrasonic waves.

The display 260 (e.g., the display 160) may include a panel 262, a hologram device 264, a projector 266, and/or a control circuit for controlling them. The panel 262 may be implemented to be flexible, transparent, or wearable. The panel 262 may be configured with the touch panel 252 in one module. According to an embodiment of the present disclosure, the panel 262 may include a pressure sensor (or a "force sensor") capable of measuring a strength of a pressure by a user's touch. The pressure sensor may be implemented integrally with the touch panel 252 or may be implemented as one or more sensors separate from the touch panel 252. The hologram device 264 may show a stereoscopic image in the air by using interference of light. The projector 266 may display an image onto a screen through projection of light. The screen may be positioned inside or outside the electronic device 201. According to an embodiment, the interface 270 may include a high-definition multimedia interface (HDMI) 272, a universal serial bus (USB) 274, an optical communication 276, or a D-subminiature 278. The interface 270 may be included in the communication interface 170 illustrated in FIG. 1. Additionally or alternatively, the interface 270 may include, for example, a mobile high-definition link (MHL) interface, an SD card/MMC interface, or an Infrared Data Association (IrDA) standard interface.

The audio module 280 may bi-directionally convert sound and an electric signal. At least one element of the audio module 280 may be included in the input/output interface 145 illustrated in FIG. 1. The audio module 280 may process sound information input or output through the speaker 282, the receiver 284, the earphone 286, or the microphone 288. The camera module 291 may be, for example, a device capable of capturing a still image or a moving image, and according to an embodiment, may include one or more image sensors (e.g., a front sensor or a rear sensor), a lens, an image signal processor (ISP), or a flash (e.g., an LED, a xenon lamp, etc.). The power management module 295 may manage power of the electronic device 201. According to an embodiment of the present disclosure, the power management module 295 may include a power management integrated circuit (PMIC), a charger IC, or a battery fuel gauge. The PMIC may have a wired and/or wireless charging scheme. The wireless charging scheme may include a magnetic-resonance type, a magnetic induction type, and an electromagnetic type, and may further include an additional circuit for wireless charging, for example, a coil loop, a resonance circuit, or a rectifier. The battery gauge may measure the remaining capacity of the battery 296 or the voltage, current, or temperature of the battery 296 during charging. The battery 296 may include, for example, a rechargeable battery and/or a solar battery.

The indicator 297 displays a particular state, for example, a booting state, a message state, or a charging state, of the electronic device 201 or a part thereof (e.g., the processor 210). The motor 298 may convert an electric signal into mechanical vibration or generates vibration or a haptic effect. The electronic device 201 may include a device for supporting the mobile TV (e.g., a GPU) to process media data according to a standard such as digital multimedia broadcasting (DMB), digital video broadcasting (DVB), or MediaFlo™. Each of the foregoing elements described herein may be configured with one or more components, names of which may vary with a type of the electronic device. In various embodiments of the present disclosure, some components of the electronic device (e.g., the electronic device 201) may be omitted or may further include other elements, and some of the components may be coupled to form one entity and identically perform functions of the components before being coupled.

Figure 3:
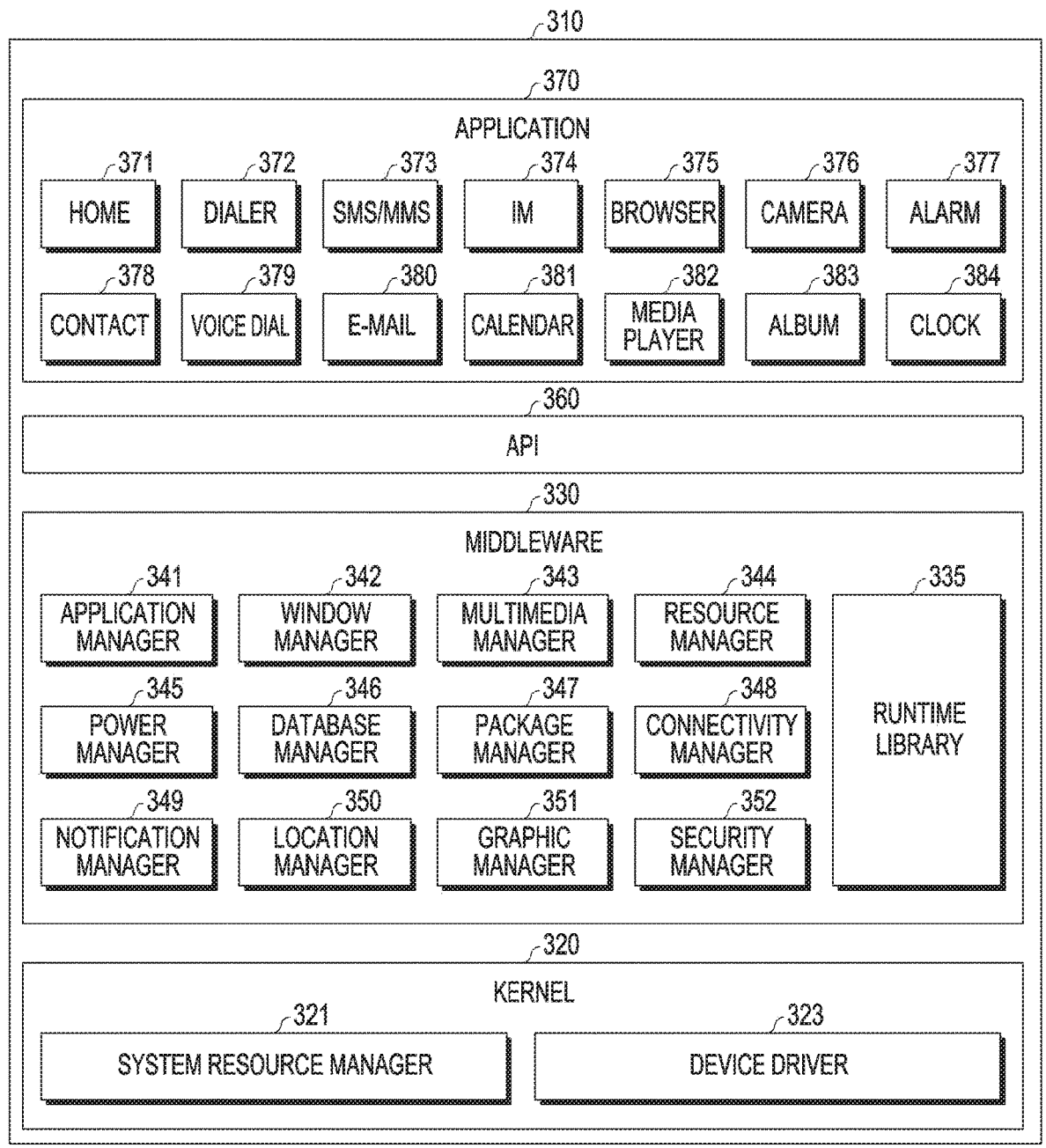
FIG. 3 is a block diagram of an electronic device according to various embodiments of the present disclosure.

FIG. 3 is a block diagram of a programming module according to various embodiments of the present disclosure. According to an embodiment of the present disclosure, a programming module 310 (e.g., the program 140) may include an OS for controlling resources associated with an electronic device (e.g., the electronic device 101) and/or various applications (e.g., the application program 147) executed on the OS. The OS may include Android™, iOS™, Windows™, Symbian™, Tizen™, or Bada™. Referring to FIG. 3, the programming module 310 may include a kernel 320 (e.g., the kernel 141), middleware 330 (e.g., the middleware 143), an application programming interface (API) 360 (e.g., the API 145), and/or an application 370 (e.g., the application program 147). At least a part of the programming module 310 may be preloaded on an electronic device or may be downloaded from an external device (e.g., the electronic device 102 or 104, or the server 106).

The kernel 320 may include a system resource manager 321 and/or a device driver 323. The system resource manager 321 may perform control, allocation, retrieval of system resources, and so forth. According to an embodiment of the present disclosure, the system resource manager 321 may include a process management unit, a memory management unit, or a file system management unit. The device driver 323 may include, for example, a display driver, a camera driver, a Bluetooth driver, a shared memory driver, a USB driver, a keypad driver, a WiFi driver, an audio driver, or an inter-process communication (IPC) driver. The middleware 330 may include provide functions that the application 370 commonly requires or provide various functions to the application 370 through the API 360 to allow the application 370 to use a limited system resource in an electronic device. According to an embodiment of the present disclosure, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses to add a new function through a programming language while the application 370 is executed. The runtime library 335 performs input/output management, memory management, or calculation function processing. The application manager 341 may manage a life cycle of the applications 370. The window manager 342 may manage a graphic user interface (GUI) resource used in a screen. The multimedia manager 343 may recognize a format necessary for playing media files and perform encoding or decoding on a media file by using a codec appropriate for a corresponding format. The resource manager 344 may manage a source code or a memory space of the applications 370. The power manager 345 may manage a battery or power and provide power information necessary for an operation of the electronic device. According to an embodiment of the present disclosure, the power manager 345 may operate with basic input/output system (BIOS). The database manager 346 may generate, search or change a database used for at least one application among the applications 370. The package manager 347 may manage the installation or update of an application distributed in a package file format.

The connectivity manager 348 may manage a wireless connection. The notification manager 349 may provide an event, e.g., an arriving message, an appointment, proximity notification, etc. The location manager 350 may manage location information of an electronic device. The graphic manager 351 may manage, for example, a graphic effect to be provided to a user or a user interface relating thereto. The security manager 352 may provide, for example, system security or user authentication. According to an embodiment of the present disclosure, the middleware 330 may further include a telephony manager for managing a voice or video call function of the electronic device or a middleware module forming a combination of functions of the above-described components. According to an embodiment of the present disclosure, the middleware 330 may provide a module specified for each type of an OS. Additionally, the middleware 330 may delete some of existing elements or add new elements dynamically. The API 360 may be provided as a set of API programming functions with a different configuration according to the OS. In the case of Android or iOS, for example, one API set may be provided by each platform, and in the case of Tizen, two or more API sets may be provided.

The application 370 may include one or more applications capable of providing a function, for example, a home application 371, a dialer application 372, a short messaging service/multimedia messaging service (SMS/MMS) application 373, an instant message (IM) application 374, a browser application 375, a camera application 376, an alarm application 377, a contact application 378, a voice dial application 379, an e-mail application 380, a calendar application 381, a media player application 382, an album application 383, a clock application 384, a health care application (e.g., an application for measuring an exercise amount, a blood sugar, etc.), or an environment information providing application (e.g., an application for providing air pressure, humidity, or temperature information or the like). According to an embodiment, the application 370 may include an information exchange application supporting information exchange between the electronic device and an external electronic device. The information exchange application may include, for example, a notification relay application for transferring specific information to the external electronic device or a device management application for managing the external electronic device. For example, the notification relay application may deliver notification information generated in another application of the electronic device to an external electronic device or may receive notification information from the external electronic device and provide the notification information to the user. The device management application may manage (e.g., install, remove, or update) a function (e.g., turn on/turn off of an external electronic device itself (or a part thereof) or control of brightness (or resolution) of a display) of an external device communicating with the electronic device, a service provided by an application operating in an external electronic device or provided by the external electronic device (e.g., a call service or a message service). According to an embodiment, the application 370 may include an application (e.g., device health care application of mobile medical equipment) designated according to an attribute of the external electronic device. According to an embodiment, the application 370 may include an application received from the external electronic device. The at least a part of the programming module 310 may be implemented (e.g., executed) by software, firmware, hardware (e.g., the processor 210), or a combination of two or more of them, and may include, for example, modules, programs, routines, sets of instructions, or processes for performing one or more functions.

Figure 4:
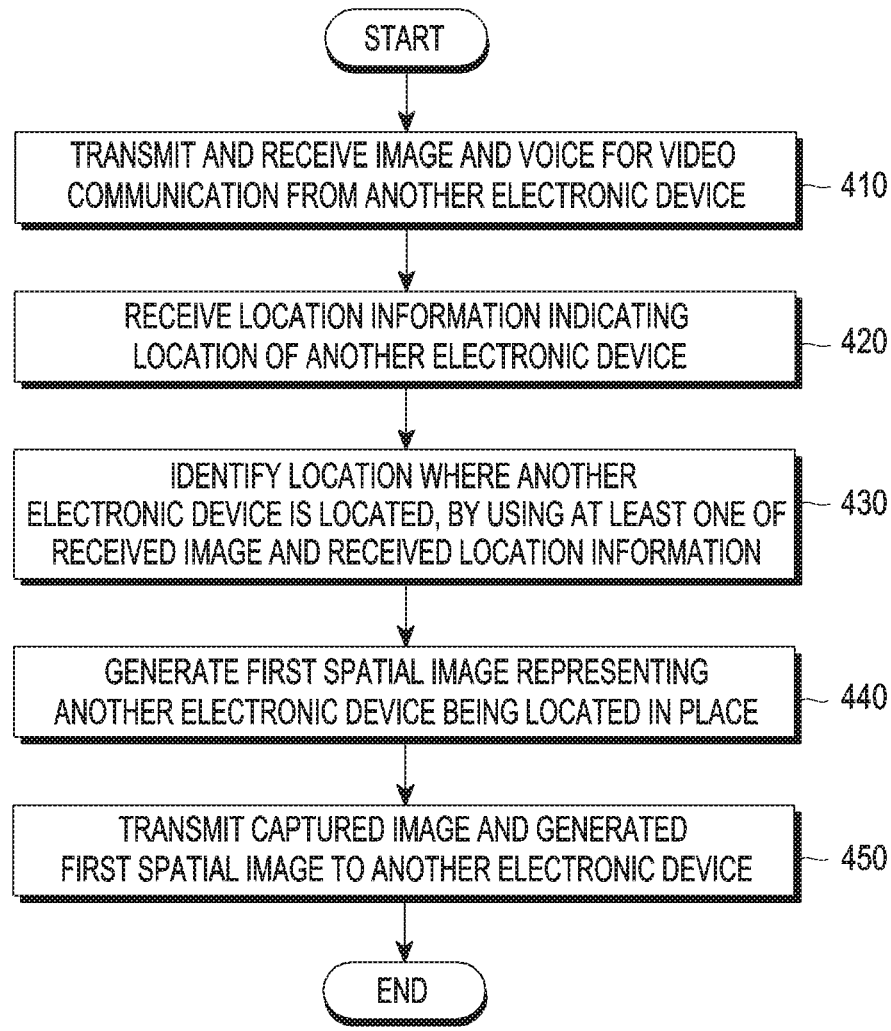
FIG. 4 is a flowchart of an operation method of an electronic device, according to various embodiments of the present disclosure.

FIG. 4 is a flowchart of an operation method of an electronic device, according to various embodiments of the present disclosure.

In operation 410, the electronic device 101 may transmit and receive an image and voice for video communication to and from another electronic device connected for video communication. The electronic device 101 may display the image received from the other electronic device and output the voice received from the other electronic device.

In operation 420, the electronic device 101 may receive location information indicating a location of the other electronic device from the other electronic device. The location information may be received from the other electronic device, together with or independently of an image and voice for video communication.

In operation 430, the electronic device 101 may identify a place where the other electronic device is located, by using at least one of the image or the location information received from the other electronic device. For example, the electronic device 101 may identify the place where the other electronic device is located, by analyzing the received image or by using the location information. When the electronic device 101 may not be capable of identifying the location of the other electronic device merely with the image or the location information, the electronic device 101 may identify the location of the other electronic device using both the image and the location information.

In operation 440, the electronic device 101 may generate the first spatial image indicating the other electronic device being located in the identified place. The first spatial image may be a 2D image or a 3D image.

In operation 450, the electronic device 101 may transmit the captured image and the generated first spatial image to the other electronic device. For example, the electronic device 101 may transmit the captured image and the first spatial image together to the other electronic device or a synthesized image of the captured image and the first spatial image to the other electronic device.

Figure 5A:
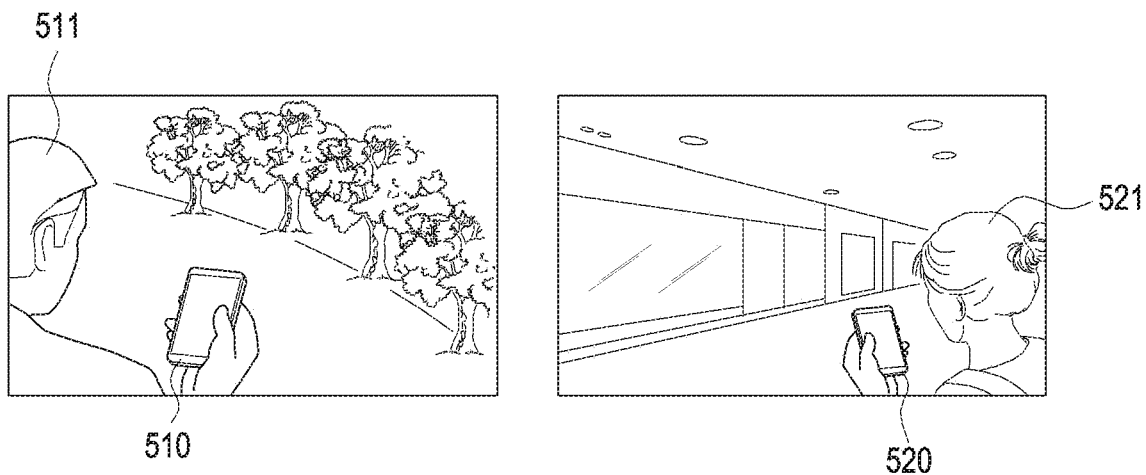
FIGS. 5A and 5B are views for describing a method of performing video communication by an electronic device, according to various embodiments of the present disclosure.
Figure 5B:
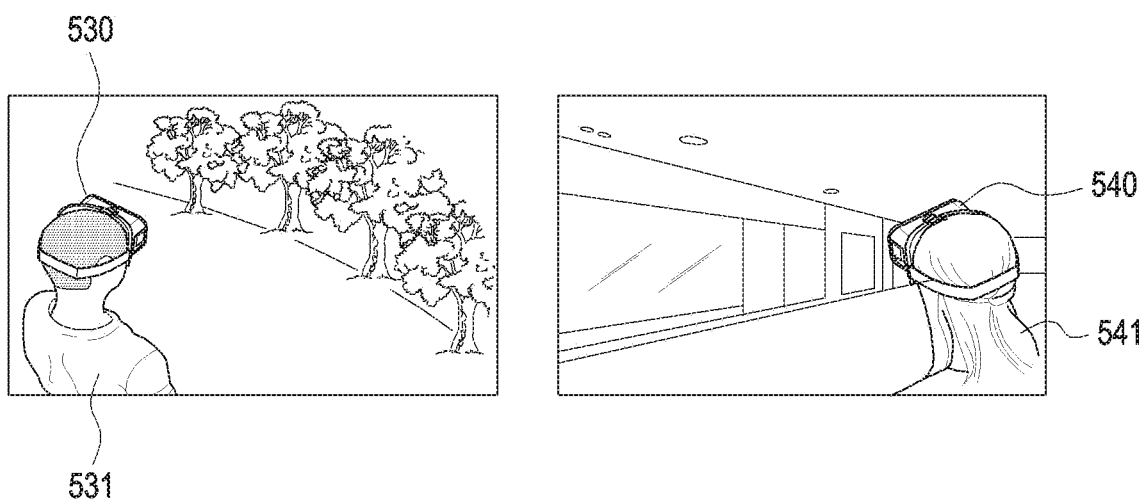

FIGS. 5A and 5B are views for describing a method of performing video communication by an electronic device, according to various embodiments of the present disclosure.

As shown in FIG. 5A, a first electronic device 510 and a second electronic device 520 according to various embodiments of the present disclosure may be connected for video communication. The first electronic device 510 may transmit an image captured through a camera module included therein and voice obtained through a microphone included therein to the second electronic device 520. The first electronic device 510 may output the image received from the second electronic device 520 on a display and output the received voice through a speaker. In this way, a first user 511 of the first electronic device 510 and a second user 521 of the second electronic device 520 may perform video communication with each other.

The first electronic device 510 may further receive location information of the second electronic device 520 from the second electronic device 520. Referring to FIG. 5A, the first electronic device 510 may identify a place where the second electronic device 520 is located, as a shopping mall, by using at least one of the image or location information received from the second electronic device 520. The electronic device 510 may generate the first spatial image indicating the second electronic device 520 being located in the shopping mall. The first electronic device 510 may transmit the first spatial image and an image captured through a camera module of the first electronic device 510 to the second electronic device 520. The second electronic device 520 may display a synthesized image of the received first spatial image and the image obtained by the first electronic device 510 on the display. Thus, the second user 521, although being located at a long distance from the first user 511, may feel realism and immersion like in the same space as the first user 511.

The second electronic device 520 may further receive location information of the first electronic device 510 from the first electronic device 510. Referring to FIG. 5A, the second electronic device 520 may identify a place where the first electronic device 510 is located, as a park, by using at least one of the image or location information received from the first electronic device 510. The second electronic device 520 may generate a second spatial image indicating the first electronic device 510 being located in the park. The second electronic device 520 may identify the place where the first electronic device 510 is located, as an outdoor place, based on the image received from the first electronic device 510. Thus, the second electronic device 520 may obtain at least one of weather information or time information based on the location information received from the first electronic device 510, and generate the second spatial image by further using the obtained weather information and time information.

The second electronic device 520 may transmit the second spatial image and the image captured through the camera module of the second electronic device 520 to the first electronic device 510. The first electronic device 510 may display a synthesized image of the received second spatial image and the image obtained by the second electronic device 520 on the display. Thus, the first user 511, although being located at a long distance from the second user 521, may feel realism and immersion like in the same space as the second user 511.

As such, the first electronic device 510 and the second electronic device 520 may transmit and receive spatial images indicating places where their counterpart electronic devices for video communication are located to and from each other, thereby providing the users thereof with experiences like in the same space.

As shown in FIG. 5B, a third electronic device 530 and a fourth electronic device 540 according to various embodiments of the present disclosure may be connected for video communication. The third electronic device 530 and the fourth electronic device 540 may be a head-mounted display (HMD) device. In this case, each of the third electronic device 530 and the fourth electronic device 540 may transmit and receive a 3D spatial image (e.g., a VR image, an AR image, etc.). Thus, a third user 531 and a fourth user 541 may be provided with more realistic spatial images through the third electronic device 530 and the fourth electronic device 540. When the third electronic device 530 and the fourth electronic device 540 are HMD devices, an image of each user may be obtained through a camera module of the HMD device or an external camera module wiredly or wirelessly connected with the HMD device.

Detailed operation methods of the third electronic device 530 and the fourth electronic device 540 are the same as the above-described operation methods of the first electronic device 510 and the second electronic device 520, and thus will not be described separately.

Figure 6A:
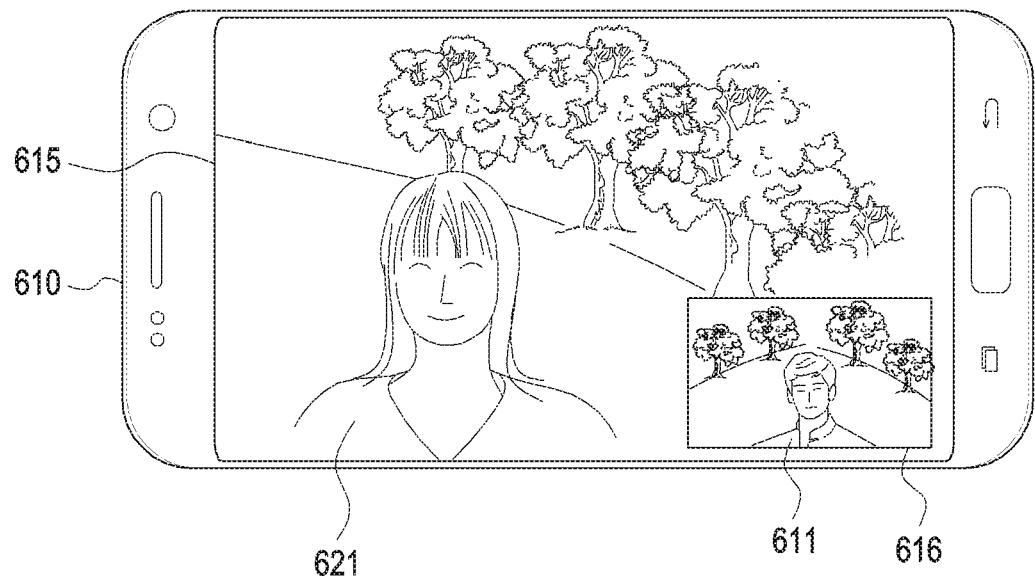
FIGS. 6A and 6B show an electronic device that performs video communication, according to various embodiments of the present disclosure.
Figure 6B:
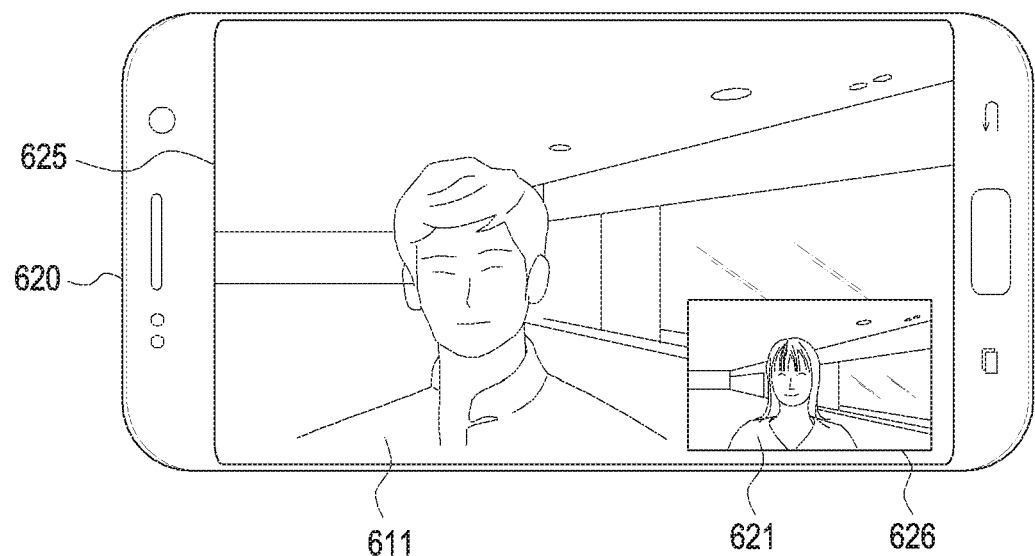

FIGS. 6A and 6B show an electronic device that performs video communication, according to various embodiments of the present disclosure.

As shown in FIG. 6A, a first electronic device 610 may display a second synthesized image 615 generated by synthesizing the second spatial image received from a second electronic device 620 with the image captured by the second electronic device 620. The second electronic device 620 may identify a place where the first electronic device 610 is located, as a park, by using at least one of location information or an image received from the first electronic device 610. Thus, the second electronic device 620 may generate a second spatial image indicating the first electronic device

610 being located in a park and transmit the generated second spatial image to the first electronic device 610.

The first electronic device 610 may display a second synthesized image 615 generated by synthesizing the second spatial image received from the second electronic device 620 with a partial image corresponding to a second user 621 in the image captured by the second electronic device 620. The first electronic device 610 may display an image 616 captured by the first electronic device 610 and the second synthesized image 615 at the same time.

As shown in FIG. 6B, the second electronic device 620 may display a first synthesized image generated by synthesizing a first spatial image received from the first electronic device 610 with an image captured by the first electronic device 610. The first electronic device 610 may identify a place where the second electronic device 620 is located, as a shopping mall, by using at least one of location information or an image received from the second electronic device 620. Thus, the first electronic device 610 may generate the first spatial image indicating the second electronic device 620 being in the shopping mall where the first electronic device is located, and transmit the generated first spatial image to the second electronic device 620.

The second electronic device 620 may display a first synthesized image 625 generated by synthesizing the first spatial image received from the first electronic device 610 with a partial image corresponding to a first user 611 in the image captured by the first electronic device 610. The second electronic device 620 may display an image 626 captured by the second electronic device 620 and the first synthesized image 625 at the same time.

In this way, the first user 611 of the first electronic device 610 and the second user 621 of the second electronic device 620, although not being in the same space, may be provided with experiences as if they are in the same space through images displayed on the first electronic device 610 and the second electronic device 620, respectively.

Although not shown, the first electronic device 610 may generate the first spatial image indicating the second electronic device 620 being located in a shopping mall and generate a synthesized image by synthesizing the first spatial image and an image received from the second electronic device 620. For example, the first electronic device 610 may generate a synthesized image by synthesizing a partial image corresponding to the second user 621 in the image received from the second electronic device 620 with the first spatial image. In this case, the first electronic device 610 may display a synthesized image by synthesizing the generated first spatial image with the partial image corresponding to the second user 621, instead of displaying the second synthesized image 615.

Although not shown, the second electronic device 620 may generate the second spatial image indicating the first electronic device 610 being located in a park and generate a synthesized image by synthesizing the second spatial image and an image received from the first electronic device 610. For example, the second electronic device 620 may generate a synthesized image by synthesizing a partial image corresponding to the first user 611 in the image received from the first electronic device 610 with the second spatial image. In this case, the second electronic device 620 may display a synthesized image by synthesizing the generated second spatial image with the partial image corresponding to the first user 611, instead of displaying the first synthesized image 625.

Figure 7:
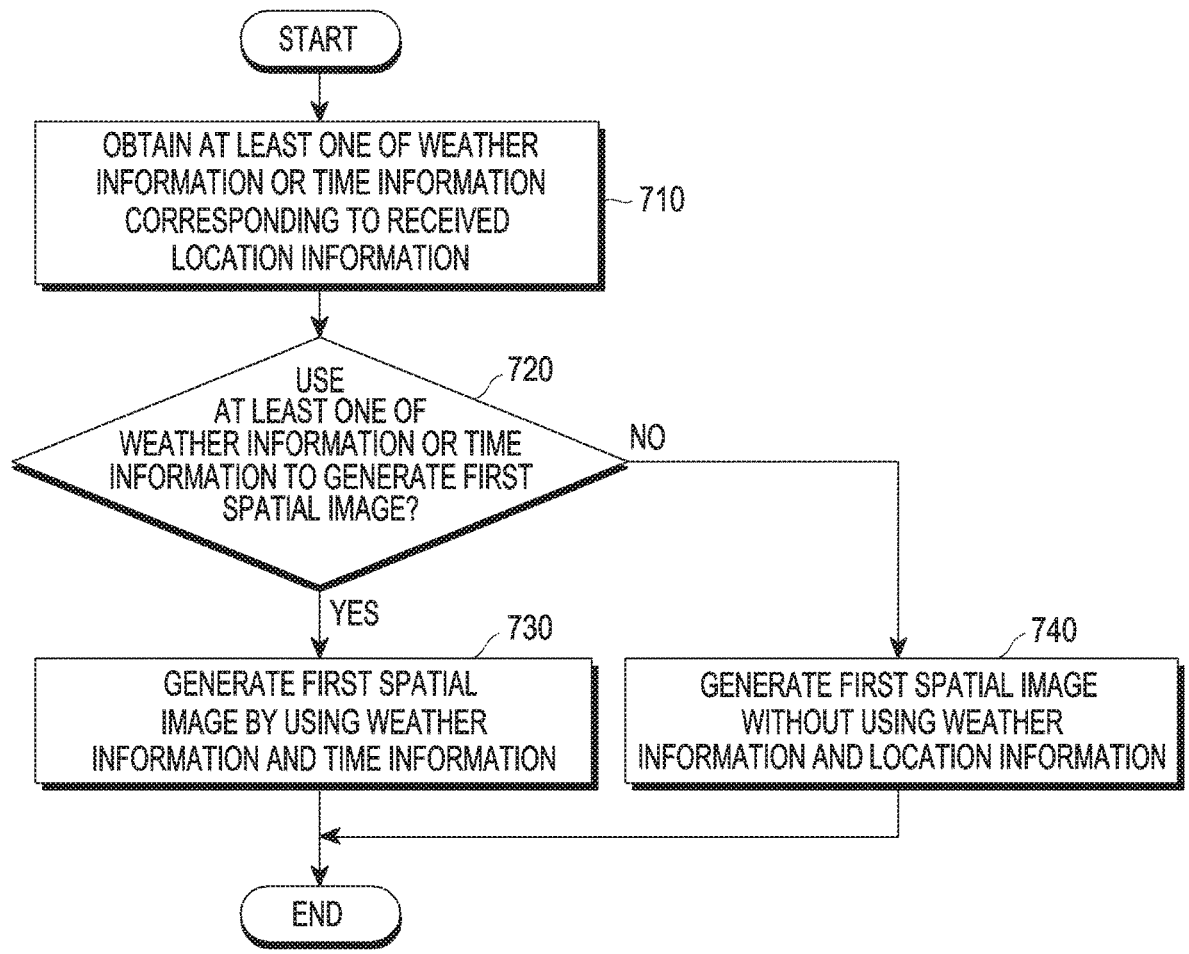
FIG. 7 is a flowchart of a method of using at least one of weather information or time information by an electronic device, according to various embodiments of the present disclosure.

FIG. 7 is a flowchart of a method of using at least one of weather information or time information by an electronic device, according to various embodiments of the present disclosure.

In operation 710, the electronic device 101 may obtain at least one of weather information or time information corresponding to location information received from another electronic device connected for video communication.

In operation 720, the electronic device 101 may determine based on an image received from the other electronic device whether to use at least one of the weather information or the time information to generate the first spatial image indicating the other electronic device being located in a place.

For example, the electronic device 101 may determine based on the received image whether a place where the other electronic device is located is an indoor or outdoor place, and determine, based on a result of the determination, whether to use at least one of the weather information or the time information to generate the first spatial image.

In operation 730, the electronic device 101 may generate the first spatial image by using the weather information and the time information, when determining that the place where the other electronic device is located is an outdoor place.

In operation 740, the electronic device 101 may generate the first spatial image without using the weather information and the time information, when determining that the place where the other electronic device is located is an indoor place.

Thus, the electronic device 101 may share, among users performing video communication, environment information related to places where the users are located.

Figure 8A:
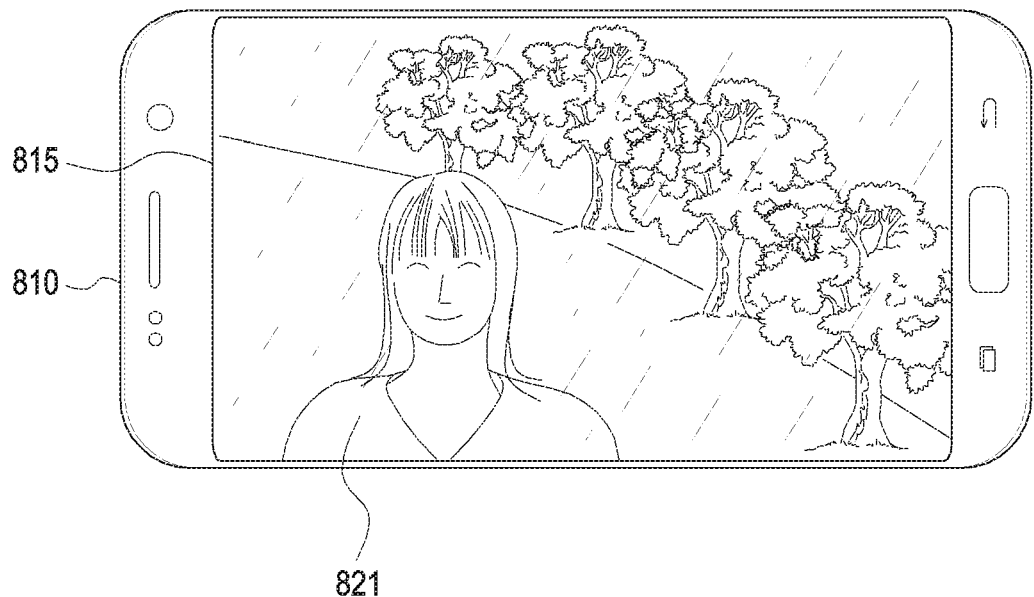
FIGS. 8A and 8B show an electronic device that displays a received spatial image, according to various embodiments of the present disclosure.
Figure 8B:
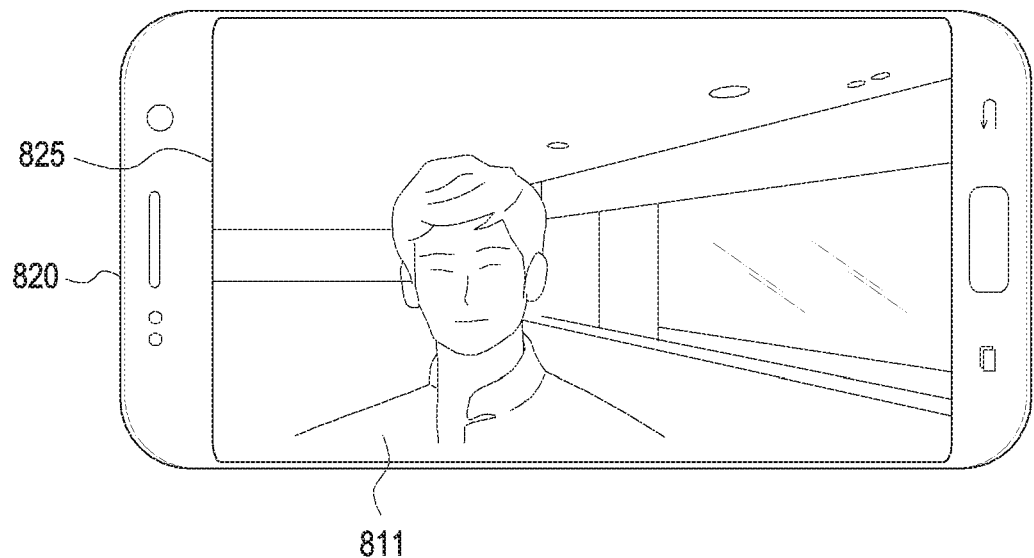

FIGS. 8A and 8B show an electronic device that displays a received spatial image, according to various embodiments of the present disclosure.

As shown in FIG. 8A, a first electronic device 810 may display a second synthesized image 815 generated by synthesizing the second spatial image received from a second electronic device 820, to which weather information of the place where the first electronic device 810 is located is applied, with the image captured by the second electronic device 820. The second electronic device 820 may identify a place where the first electronic device 810 is located, as a park, by using at least one of location information or an image received from the first electronic device 810.

Based on location information of the first electronic device 810 received from the first electronic device 810, the second electronic device 820 may obtain at least one of weather information or time information corresponding to the location information. The second electronic device 820 may determine whether to use at least one of the obtained weather information or time information to generate the second spatial image indicating the first electronic device 810 being located in a park. The second electronic device 820 may generate the second spatial image by using at least one of the obtained weather information or time information since the park where the first electronic device 810 is located is an outdoor place. The second electronic device 820 may transmit the generated second spatial image to the first electronic device 810.

Thus, a first electronic device 810 may display the second synthesized image 815 generated by synthesizing the second spatial image generated to reflect current weather of a park where the first electronic device 810 is located, e.g., rainy weather, with the image captured by the second electronic device 820. Although not shown, the second electronic device 820 may generate the second spatial image to further reflect the obtained time information. For example, when a time zone of the place where the first electronic device 810 is located is night time based on the obtained time information, the second electronic device 820 may generate the second spatial image without sunlight and express light emitted from a streetlight.

The first electronic device 810 may display the second synthesized image 815 generated by synthesizing the second spatial image generated to reflect the weather information received from the second electronic device 820 with a partial image corresponding to a second user 821 in the image captured by the second electronic device 820.

As shown in FIG. 8B, the second electronic device 820 may display a first synthesized image 825 generated by synthesizing a first spatial image received from the first electronic device 810 with an image captured by the first electronic device 810. The first electronic device 810 may identify a place where the second electronic device 820 is located, as a shopping mall, by using at least one of location information or an image received from the second electronic device 820.

Based on location information of the second electronic device 820 received from the second electronic device 820, the first electronic device 810 may obtain at least one of weather information or time information corresponding to the location information. The first electronic device 810 may determine whether to use at least one of the obtained weather information or time information to generate the first spatial image indicating the second electronic device 820 being located in a shopping mall. The first electronic device 810 may generate the first spatial image by using at least one of the obtained weather information or time information since the shopping mall that is the place where the second electronic device 820 is located is an indoor place. The first electronic device 810 may transmit the generated first spatial image to the second electronic device 820.

The second electronic device 820 may display a first synthesized image 825 generated by synthesizing the first spatial image received from the first electronic device 810 with a partial image corresponding to a first user 611 in the image captured by the first electronic device 810.

In this way, the first user 811 of the first electronic device 810 and the second user 821 of the second electronic device 820, although not being in the same space, may be provided with experiences as if they are in the same space and environment through images displayed on the first electronic device 810 and the second electronic device 820, respectively.

Figure 9:
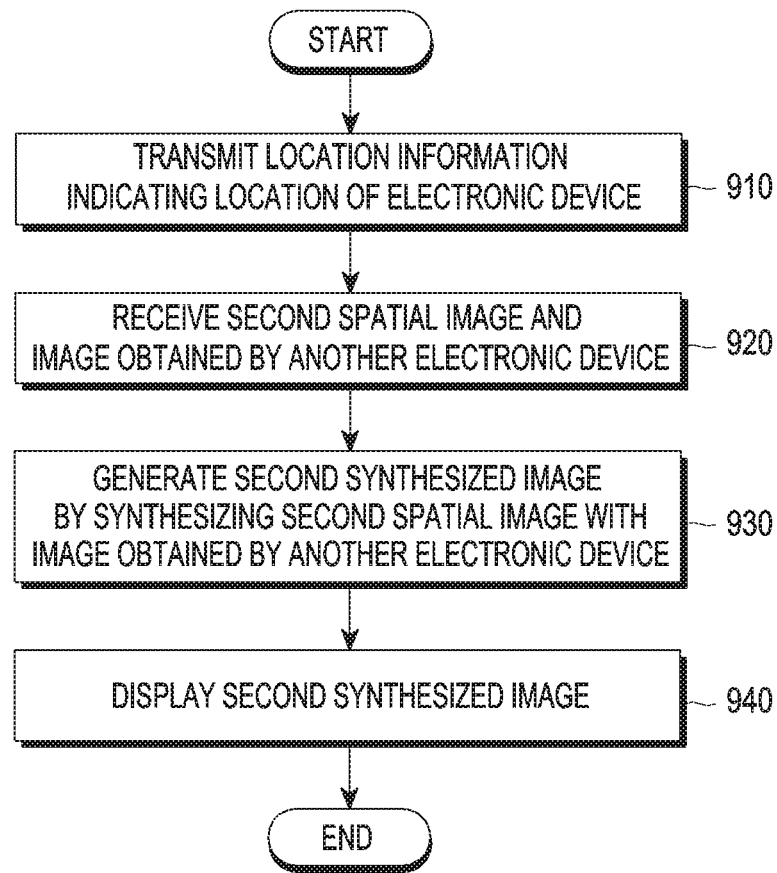
FIG. 9 is a flowchart of an operation method of an electronic device, according to various embodiments of the present disclosure.

FIG. 9 is a flowchart of an operation method of an electronic device, according to various embodiments of the present disclosure.

In operation 910, the electronic device 101 may transmit location information indicating the location of the electronic device 101 to another electronic device connected for video communication. The electronic device 101 may generate the location information indicating the location of the electronic device 101 based on an obtained GPS signal.

In operation 920, the electronic device 101 may receive from the other electronic device, the second spatial image generated by the other electronic device to indicate the place where the electronic device 101 is located, and the image obtained by the other electronic device. The other electronic device may obtain the image through a camera module included therein, or through another connected camera module.

In operation 930, the electronic device 101 may generate a second synthesized image by synthesizing the second spatial image with the image obtained by the other electronic device. In operation 940, the electronic device 101 may display the generated second synthesized image.

As such, the electronic device 101 may generate and transmit a spatial image indicating a place where another electronic device is located, and at the same time, receive and display a spatial image generated by the other electronic device to indicate a space where the electronic device 101 is located.

Figure 10:
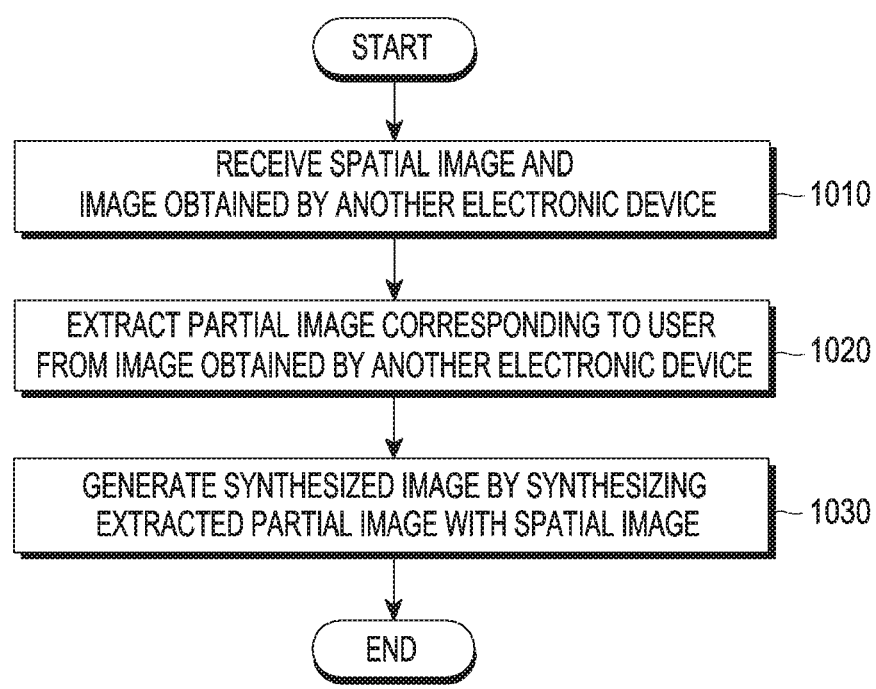
FIG. 10 is a flowchart of a method of generating a synthesized image by an electronic device, according to various embodiments of the present disclosure.

FIG. 10 is a flowchart of a method of generating a synthesized image by an electronic device, according to various embodiments of the present disclosure.

In operation 1010, the electronic device 101 may receive from another electronic device connected for video communication, a spatial image generated by the other electronic device to indicate the place where the electronic device 101 is located, and the image obtained by the other electronic device.

In operation 1020, the electronic device 10 may extract a partial image corresponding to a user of the second electronic device from the image obtained by the other electronic device.

In operation 1030, the electronic device 101 may generate a synthesized image by synthesizing the extracted partial image with the spatial image. For example, the electronic device 101 may generate the synthesized image by synthesizing the extracted partial image with the spatial image such that the spatial image is a background of the partial image.

When the electronic device 101 receives the synthesized image by synthesizing the spatial image with the image obtained by the other electronic device from the other electronic device, operations 1010 through 1030 may not be performed.

Figure 11:
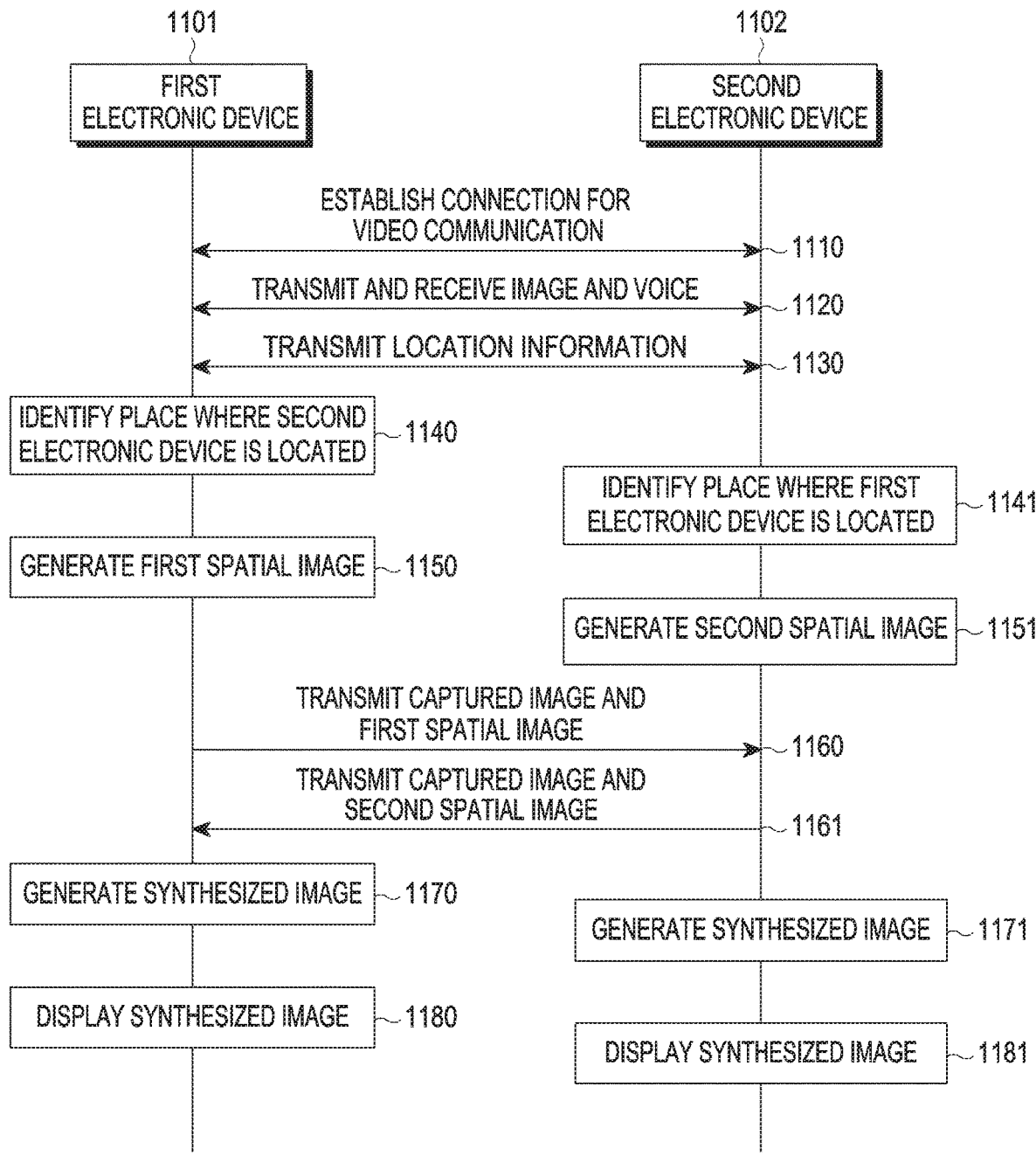
FIG. 11 is a flowchart of an operation method of a first electronic device and a second electronic device, according to various embodiments of the present disclosure.

FIG. 11 is a flowchart of an operation method of a first electronic device and a second electronic device, according to various embodiments of the present disclosure.

In operation 1110, a first electronic device 1101 and a second electronic device 1102 may establish connection for video communication. For example, the first electronic device 1101 may send a request for a call for video communication to the second electronic device 1102, and the second electronic device 1102 may respond to the requested call, such that the connection for video communication may be established.

In operation 1120, the first electronic device 1101 and the second electronic device 1102 may transmit and receive images and voice captured by the devices to and from each other.

In operation 1130, the first electronic device 1101 may further transmit location information of the first electronic device 1101 to the second electronic device 1102. The second electronic device 1102 may further transmit location information of the second electronic device 1102 to the first electronic device 1101. Although operations 1130 and 1120 are illustrated separately in FIG. 11, the present disclosure is not limited to the illustration such that the location information may be transmitted together with an image and voice.

In operation 1140, the first electronic device 1101 may identify a place where the second electronic device 1102 is located, by using at least one of the image or location information received from the second electronic device 1102. In operation 1141, the second electronic device 1102 may identify a place where the first electronic device 1101 is located, by using at least one of the image or location information received from the first electronic device 1101.

In operation 1150, the first electronic device 1101 may generate the first spatial image indicating the second electronic device 1102 being located in the place identified in operation 1140. The first spatial image may be a 2D image or a 3D image. In operation 1151, the first electronic device 1102 may generate the second spatial image for indicating the place identified in operation 1141 where the first electronic device 1101 is located.

In operation 1160, the first electronic device 1101 may transmit the captured image and the generated first spatial image to the second electronic device 1102. In operation 1161, the second electronic device 1102 may transmit the captured image and the generated second spatial image to the first electronic device 1101.

In operation 1170, the first electronic device 1101 may generate a synthesized image by synthesizing an image received from the second electronic device 1102 with the second spatial image. In operation 1171, the second electronic device 1102 may generate a synthesized image by synthesizing the image received from the first electronic device 1101 with the first spatial image.

In operation 1180, the first electronic device 1101 may display the generated synthesized image. In operation 1181, the second electronic device 1102 may display the generated synthesized image.

The first electronic device 1101 and the second electronic device 1101 may receive synthesized images, respectively. In this case, the first electronic device 1101 and the second electronic device 1102 may display the received synthesized images without performing operations 1170 and 1171.

The first electronic device 1101 may generate the synthesized image by synthesizing the generated first spatial image with the image received from the second electronic device 1102. In this case, as described in relation to operations 1170 and 1180, the first electronic device 1101 may display a synthesized image generated by synthesizing the first spatial image generated by the first electronic device 1101 with the image received from the second electronic device 1102 without displaying the synthesized image generated by synthesizing the image received from the second electronic device 1102 with the second spatial image.

Likewise, the second electronic device 1101 may generate the synthesized image by synthesizing the generated second spatial image with the image received from the first electronic device 1101. In this case, as described in relation to operations 1171 and 1181, the second electronic device 1102 may display a synthesized image generated by synthesizing the second spatial image generated by the second electronic device 1102 with the image received from the first electronic device 1101 without displaying the synthesized image generated by synthesizing the image received from the first electronic device 1101 with the first spatial image.

Each of the foregoing elements described herein may be configured with one or more components, names of which may vary with a type of the electronic device. In various embodiments, the electronic device may include at least one of the foregoing elements, some of which may be omitted or to which other elements may be added. In addition, some of the elements of the electronic device according to various embodiments may be integrated into one entity to perform functions of the corresponding elements in the same manner as before they are integrated.

A term "module" used herein may mean, for example, a unit including one of or a combination of two or more of hardware, software, and firmware, and may be used interchangeably with terms such as logic, a logic block, a part, or a circuit. The "module" may be a part configured integrally, a minimum unit or a portion thereof performing one or more functions. The "module" may be implemented mechanically or electronically, and may include an application-specific integrated circuit (ASIC) chip, field-programmable gate arrays (FPGAs), and a programmable-logic device performing certain operations already known or to be developed.

At least a part of an apparatus (e.g., modules or functions thereof) or a method (e.g., operations) according to various embodiments may be implemented with an instruction stored in a computer-readable storage medium (e.g., the memory 130) in the form of a programming module. When the instructions are executed by a processor (for example, the processor 120), the processor may perform functions corresponding to the instructions.

The computer-readable recording medium includes hard disk, floppy disk, or magnetic media (e.g., a magnetic tape, optical media (e.g., compact disc read only memory (CD-ROM) or digital versatile disc (DVD), magneto-optical media (e.g., floptical disk), an embedded memory, and so forth. The instructions may include a code generated by a compiler or a code executable by an interpreter. Modules or programming modules according to various embodiments of the present disclosure may include one or more of the foregoing elements, have some of the foregoing elements omitted, or further include additional other elements. Operations performed by the module, the program, or another component according to various embodiments may be carried out sequentially, in parallel, repeatedly, or heuristically, or one or more of the operations may be executed in a different order or omitted, or one or more other operations may be added.

According to various embodiments of the present disclosure, a non-transitory computer-readable recording medium has recorded thereon a program to be executed on a computer, in which the program may include executable instructions that cause, when executed by a processor, the processor to perform operations of receiving an image and voice for video communication from an electronic device connected for the video communication, receiving location information indicating a location of the electronic device from the electronic device, identifying a place where the electronic device is located, by using at least one of the received image or the received location information, generating a spatial image indicating the electronic device being located in the identified place, and transmitting the captured image and the generated spatial image to the electronic device.

The embodiments disclosed herein have been provided for description and understanding of disclosed technical matters, and are not intended to limit the scope of the present disclosure. Therefore, it should be construed that the scope of the present disclosure includes any change or other various embodiments based on the technical spirit of the present disclosure.

The invention claimed is:

1. A first electronic device comprising:
a communication module;
a display;
a camera module; and
a processor,
wherein the processor is configured to:
receive an image and voice for video communication from a second electronic device connected for the video communication through the communication module;
receive location information indicating a location of the second electronic device from the second electronic device through the communication module;
identify a place where the second electronic device is located, by using at least one of the received image or the received location information;

generate a first spatial image indicating the second electronic device being located in the identified place; and transmit an image captured through the camera module and the generated first spatial image to the second electronic device through the communication module.

2. The electronic device of claim 1, wherein the processor is configured to extract a plurality of feature points from the received image and search for at least one place corresponding to the extracted feature points.

3. The electronic device of claim 2, wherein, when one place is searched, the processor is configured to identify the searched place as the place where the second electronic device is located.

4. The electronic device of claim 2, wherein, when a plurality of places are searched, the processor is configured to identify a place corresponding to the location information among the plurality of searched places as the place where the second electronic device is located.

5. The electronic device of claim 1, wherein the processor is configured to obtain at least one of weather information or time information corresponding to the location information from an external server.

6. The electronic device of claim 5, wherein the processor is configured to determine based on an image received from the second electronic device whether to use at least one of the weather information or the time information to generate the first spatial image.

7. The electronic device of claim 6, wherein the processor is configured to determine not to use the weather information and the time information to generate the first spatial image, when determining that the identified place where the second electronic device is located is an indoor place, based on the image received from the second electronic device.

8. The electronic device of claim 6, wherein the processor is configured to determine to use at least one of the weather information or the time information to generate the first spatial image, when determining that the identified place where the second electronic device is located is an outdoor place, based on the image received from the second electronic device.

9. The electronic device of claim 1, wherein the processor is configured to:
extract a partial image corresponding to a user from the captured image; and
generate a first synthesized image by synthesizing the extracted partial image with the first spatial image.

10. The electronic device of claim 1, further comprising a global positioning system (GPS) module configured to receive a GPS signal,
wherein the processor is configured to:
generate location information indicating a location of the first electronic device, based on the GPS signal obtained from the GPS module; and
transmit the location information to the second electronic device through the communication module.

11. The electronic device of claim 10, wherein the processor is configured to:
receive, from the second electronic device through the communication module, a second spatial image generated by the second electronic device to indicate a place where the first electronic device is placed and an image obtained by the second electronic device; and
display, on the display, a second synthesized image generated by synthesizing the second spatial image generated by the second electronic device with the image obtained by the second electronic device.

12. The electronic device of claim 11, wherein the processor is configured to:
extract a partial image corresponding to a user of the second electronic device from the image obtained by the second electronic device; and
generate the second synthesized image by synthesizing the extracted partial image with the second spatial image generated by the second electronic device.

13. The electronic device of claim 11, wherein the processor is configured to display the image captured through the camera module and the second synthesized image on the display at the same time.

14. The electronic device of claim 11, wherein the processor is configured to:
generate a third synthesized image by synthesizing the second spatial image with the partial image corresponding to the user in the image captured through the camera module; and
display the second synthesized image and the third synthesized image together on the display.

15. An operation method of a first electronic device, the operation method comprising:
receiving an image and voice for video communication from a second electronic device connected for the video communication;
receiving location information indicating a location of the second electronic device from the second electronic device;
identifying a place where the second electronic device is located, by using at least one of the received image or the received location information;
generating a first spatial image indicating the second electronic device being located in the identified place; and
transmitting the captured image and the generated first spatial image to the second electronic device.

* * * * *